United States Patent
Inskip, VI et al.

(10) Patent No.: US 8,813,117 B1
(45) Date of Patent: Aug. 19, 2014

(54) CONTENT SUBSET CONDITIONAL ACCESS FRAMEWORK

(75) Inventors: Thomas William Inskip, VI, Kirkland, WA (US); Duncan MacLean, Kirkland, WA (US)

(73) Assignee: Google Inc., Mountain View, CA (US)

( * ) Notice: Subject to any disclaimer, the term of this patent is extended or adjusted under 35 U.S.C. 154(b) by 40 days.

(21) Appl. No.: 13/459,040

(22) Filed: Apr. 27, 2012

(51) Int. Cl.
*H04N 7/167* (2011.01)
*H04N 21/435* (2011.01)
*H04N 21/418* (2011.01)
*H04N 21/266* (2011.01)

(52) U.S. Cl.
CPC .......... *H04N 7/1675* (2013.01); *H04N 21/435* (2013.01); *H04N 21/4181* (2013.01); *H04N 21/26606* (2013.01)
USPC ............... 725/31; 725/34; 725/105; 709/231

(58) Field of Classification Search
CPC ............. H04N 7/1675; H04N 21/435; H04N 21/4181; H04N 21/26606
USPC ............................. 725/31, 34, 105; 709/231
See application file for complete search history.

(56) References Cited

U.S. PATENT DOCUMENTS

| | | | |
|---|---|---|---|
| 7,263,497 B1 * | 8/2007 | Wiser et al. ..................... 705/51 |
| 7,483,958 B1 * | 1/2009 | Elabbady et al. ............. 709/217 |
| 8,243,924 B2 * | 8/2012 | Chen et al. ..................... 380/217 |
| 2004/0162787 A1 * | 8/2004 | Madison et al. ................ 705/64 |
| 2005/0097313 A1 * | 5/2005 | Bolosky et al. ............... 713/150 |
| 2005/0120132 A1 * | 6/2005 | Hutter ........................... 709/234 |
| 2008/0170630 A1 * | 7/2008 | Falik et al. ............... 375/240.29 |
| 2008/0294786 A1 * | 11/2008 | Tinker et al. .................. 709/229 |
| 2009/0003600 A1 * | 1/2009 | Chen et al. ..................... 380/217 |
| 2009/0327698 A1 * | 12/2009 | Baker et al. .................... 713/153 |
| 2010/0235472 A1 * | 9/2010 | Sood et al. .................... 709/219 |
| 2011/0099594 A1 * | 4/2011 | Chen et al. .................... 725/105 |
| 2011/0196982 A1 * | 8/2011 | Chen et al. .................... 709/231 |
| 2012/0110620 A1 * | 5/2012 | Kilar et al. ...................... 725/34 |
| 2012/0311721 A1 * | 12/2012 | Chen et al. ...................... 726/27 |

* cited by examiner

*Primary Examiner* — Nasser Goodarzi
*Assistant Examiner* — Michael B Pierorazio
(74) *Attorney, Agent, or Firm* — Fenwick & West LLP

(57) ABSTRACT

The invention provides secure playback on a client of a selected version of content with files downloaded from a corresponding package stored on a content server. The package includes a plurality of video and audio files for the available versions of the content. Each package of files includes a master manifest that lists the files included in the package. Also, each file listed in the master manifest includes a separate hash value. Separate packages include other video and audio files and other master manifests for available versions of other/different content. In at least one embodiment, one or more subset manifests are generated from the master manifest. Each subset manifest lists a portion of the files listed in the master manifest and the corresponding hash values for these files.

17 Claims, 10 Drawing Sheets

```
<smil>
<head>
</head>
<body>
<par>
<switch>
<video src="adaptive_movie_sd_500.wvm" systemBitRate="521373"\>
<video src="adaptive_movie_sd_1200.wvm" systemBitRate="1248383"\>
<video src="adaptive_movie_sd_2000.wvm" systemBitRate="2077261"\>
<video src="adaptive_movie_sd_3000.wvm" systemBitRate="3022773"\>
<video src="adaptive_movie_hd_2000.wvm" systemBitRate="2078879"\>
<video src="adaptive_movie_hd_4000.wvm" systemBitRate="4176763"\>
<video src="adaptive_movie_hd_6000.wvm" systemBitRate="6065536"\>
<video src="adaptive_movie_hd_8000.wvm" systemBitRate="8234334"\>
</switch>
<switch>
<audio src="adaptive_movie_eng_2_0.wvm" systemLanguage="eng">
<audio src="adaptive_movie_rus_2_0.wvm" systemLanguage="rus"\>
<audio src="adaptive_movie_fra_2_0.wvm" systemLanguage="fra"\>
<audio src="adaptive_movie_eng_5_1.wvm" systemLanguage="eng"\>
<audio src="adaptive_movie_rus_5_1.wvm" systemLanguage="rus"\>
<audio src="adaptive_movie_fra_5_1.wvm" systemLanguage="fra"\>
</switch>
</par>
</body>

</smil>
```

*FIG. 8-1*

```
<smil>
<head>
</head>
<body>
<par>
<switch>
<video src="adaptive_movie_sd_500.wvm" systemBitRate="521373"
hash="4cdb32429f65961efbcc4a744ab20fbe1c065b5c2897aa0be59d82e8c6edc916"\>
<video src="adaptive_movie_sd_1200.wvm" systemBitRate="1248383"
hash="999a0485eb7749a5bc21f11256d0b05a312c6ff6f71b3d511d7f23773ff231c2"\>
<video src="adaptive_movie_sd_2000.wvm" systemBitRate="2077261"
hash="6161393ace5d326ef4d88a4a4a24ad2af2c5c1f26b298cee20de213d3d3d9ec8"\>
<video src="adaptive_movie_sd_3000.wvm" systemBitRate="3022773"
hash="33d28b07b4c2446f73938dd53a3294642fe4de218c3169e3876ff585ede01814"\>
<video src="adaptive_movie_hd_2000.wvm" systemBitRate="2078879"
hash="2d3249db77f9bec0d544069b7cc114731e241c8c3e49a3bc0388144e528d5e3d"\>
<video src="adaptive_movie_hd_4000.wvm" systemBitRate="4176763"
hash="c75639b168fb7c4144aebe51cf87871306e60169d658e8b4569b8b40e9315933"\>
<video src="adaptive_movie_hd_6000.wvm" systemBitRate="6065536"
hash="216f5055593608e15120bd0b9312875891e7f7fd80d8fd45f03096f99412b7ce"\>
<video src="adaptive_movie_hd_8000.wvm" systemBitRate="8234334"
hash="174e1c82195fd884842fb9c4fa47e60a0f5434a552673 16c538b64cd2d18f11c"\>
</switch>
<switch>
<audio src="adaptive_movie_eng_2_0.wvm" systemLanguage="eng"
hash="21b6325c21d042419c9772d02c33966473fec8f96cae8f05a6b328f845464331"\>
<audio src="adaptive_movie_rus_2_0.wvm" systemLanguage="rus"
hash="e51db5ac4b36fb8ccefc8674b468cc460c42ddd1e019d1bd14f146e6b67450c8"\>
<audio src="adaptive_movie_fra_2_0.wvm" systemLanguage="fra"
hash="5a6b94f273d41bee5416ce933e13543b1fc5a5fc0b01f0d95b7c759c015d078a"\>
<audio src="adaptive_movie_eng_5_1.wvm" systemLanguage="eng"
hash="165de1f9fd044aecf02137aa0c05958c68a838265fe5d3496c4f666e9d554b8f"\>
<audio src="adaptive_movie_rus_5_1.wvm" systemLanguage="rus"
hash="8afd76e612ba3c6dfb63a0c9b7936d4efc1b1e4c62c90654e8744d34548065b5"\>
<audio src="adaptive_movie_fra_5_1.wvm" systemLanguage="fra"
hash="5f702f223f7796bf09434e73242df503df2c64a3a946cad278f875937b760076"\>
</switch>
</par>

</body>

</smil>
```

FIG. 8-2

```
<smil>
<head>
</head>
<body>
<par>
<switch>
<video src="adaptive_movie_sd_500.wvm" systemBitRate="521373"
hash="4cdb32429f65961efbcc4a744ab20fbe1c065b5c2897aa0be59d82e8c6cdc916"\>
<video src="adaptive_movie_sd_1200.wvm" systemBitRate="1248383"
hash="999a0485eb7749a5bc21f11256d0b05a312c6ff6f71b3d511d7f23773ff231c2"\>
<video src="adaptive_movie_sd_2000.wvm" systemBitRate="2077261"
hash="6161393ace5d326ef4d88a4a4a24ad2af2c5c1f26b298cee20de213d3d3d9ec8"\>
<video src="adaptive_movie_sd_3000.wvm" systemBitRate="3022773"
hash="33d28b07b4c2446f73938dd53a3294642fe4dc218c3169e3876ff585ede01814"\>
</switch>
<switch>
<audio src="adaptive_movie_eng_2_0.wvm" systemLanguage="eng"
hash="21b6325c21d042419c9772d02c33966473fec8f96cae8f05a6b328f845464331"\>
<audio src="adaptive_movie_rus_2_0.wvm" systemLanguage="rus"
hash="e51db5ac4b36fb8ccefc8674b468cc460e42ddd1e019d1bd14f146e6b67450c8"\>
<audio src="adaptive_movie_fra_2_0.wvm" systemLanguage="fra"
hash="5a6b94f273d41bee5416ce933e13543b1fc5a5fc0b01f0d95b7c759c015d078a"\>
</switch>
</par>
</body>
</smil>
```

CONTENT SUBSET CONDITIONAL ACCESS FRAMEWORK

TECHNICAL FIELD

The invention relates generally to content distribution and, more particularly, but not exclusively to controlling different versions of content that are made available for playback by a user.

BACKGROUND

The advancement of networks and computing devices has increased the demand for content that can be displayed to users on remotely networked devices, such as desktop computers, notebook computers, set-top boxes, video game consoles, tablet computers, smart phones, e-readers, mobile devices, and the like. Typically, these users have different requirements, such as content subscriptions, platform capability, audio configurations, and personal preferences. Also, content providers may have different types of content that they can provide users. The content providers often separately store different packages of files for different types and/or versions of content, which is subsequently provided to particular users. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 8-1 illustrates a non-exhaustive example of a master manifest of a plurality of files in a package along with a hash value for each file;

FIG. 8-2 shows a non-exhaustive example of a master manifest of a plurality of files included in a package; and FIG. 8-3 illustrates a non-exhaustive example of a subset manifest of a plurality of files along with a hash value for each of these files, in accordance with the various embodiments.

DESCRIPTION OF THE VARIOUS EMBODIMENTS

Figure 1:
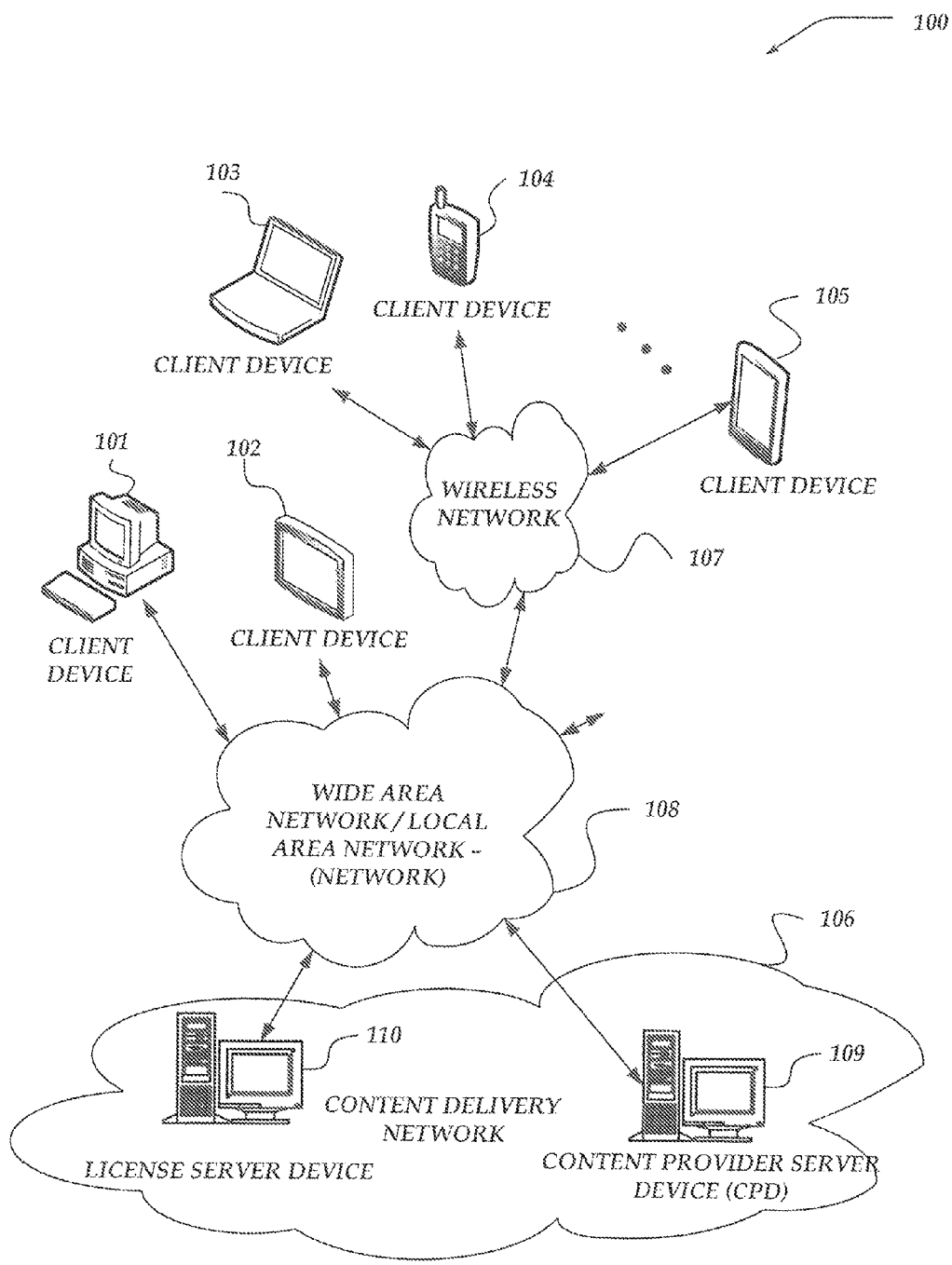
FIG. 1 illustrates a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes any digital data that may be communicated over a network to be remotely displayed by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3GP, and ASF (Advanced Systems Form, and the like. A video encoding format, such as H.264, and the like may be encapsulated in the container. The content may be distributed as a rights managed systems stream of data over a network such as Pay Per View (PPV), Video On Demand (VoD), and the like for playback by a remote network device.

As used herein, the term "video version" refers to a separate track of displayable images such as movies, videos, pictures, illustrations, graphics, and the term "audio version" refers to a separate track of audio signals, e.g., music, spoken word, sound effects, and the like.

As used herein, the term "hash" refers to a cryptographic hash, message digest, and the like.

As used herein, the term "package" refers to a virtual grouping of a plurality of audio and video files for all available versions of the same content. For example, the package for a movie (content) might include a plurality of video files having several different resolutions, e.g., 1080p, 1080i, 720p, and VGA. The package might also include a plurality of audio files having different characteristics, such as multiple spoken languages, one or more audio channels, and multiple bit sampling rates. The package may further include a master manifest that lists all of the files included in the package.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards enabling secure playback on a client of a selected version of content with files downloaded from a corresponding package stored on a content server. The package includes a plurality of video and audio files for the available versions of the content. Each package of files includes a master manifest that lists the files included in the package. Also, each file listed in the master manifest includes a separate hash value. Separate packages include other video and audio files and other master manifests for available versions of other/different content. In at least one embodiment, one or more subset manifests are generated from the master manifest for its corresponding package. Each subset manifest lists a portion of the files listed in the master manifest and the corresponding hash values for these files. Also, in at least one embodiment, an overall hash value is generated for each subset manifest. In at least one embodiment, each hash value is stored on a license server.

In at least one embodiment, the client provides a request for a selected version of content that is listed in a subset manifest that may be provided by a web application, such as a website on a content delivery network. The client downloads a portion of each file listed in the subset manifest. Next, the client regenerates the corresponding hash values for each file in the subset manifest and then compares the regenerated hash values to those hash values in the subset manifest. If these hash values are equal, i.e., binary identical, the client computes a manifest hash value for the entire subset manifest file. The client provides a request for a license for the subset manifest content from a license server. The request includes the manifest hash value. If the license server determines that the client is approved for playback of the selected version of content and the client's manifest hash value matches a previously computed manifest hash value that is stored at the license server, the license server provides a license to the client which may also include a mechanism for decrypting content such as a decryption key. Next, the client provides the license to the content server, which downloads the selected version of content to the client for subsequent playback. Alternatively, if the manifest hash value doesn't match the previously computed manifest hash value stored at the license server, the license server determines that the subset manifest is tampered with and does not provide a license to the client.

In at least one embodiment, a hash value for a file is based on a portion of the corresponding file listed in the master manifest. In at least one embodiment, this portion may be the non-mutable portion of the file such as that portion of a file that includes Digital Rights Management (DRM) data, index data, and the like. In at least another embodiment, a hash value may be generated on the entire file. Additionally, in at least one embodiment, the master manifest and/or the subset manifest may be a Mark Up Language file, such as an XML file, and the like. Also, in at least one embodiment, a graphical user interface (GUI) is provided to enable a user to select an available version of content for playback at a client device.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 108, wireless network 107, client devices 101-105, Content Provider Server Device ("CPD") 109, and Intermediate Service Provider Device ("ISPD") 110.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device useable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, and the like, employing virtually any web-based protocol, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Audio Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, CPD 109, ISPD 110, or other computing devices.

Client devices 101-106 may further be configured to include a client application that enables an end-user to log into an end-user account that may be managed by another computing device, such as CPD 109, ISPD 110, or the like. Such end-user account, in one non-limiting example, may be configured to enable the end-user to manage one or more online activities, including in one non-limiting example, search activities, social networking activities, browse various websites, communicate with other users, or the like. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global. System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 109 and license server device 110 (part of content delivery network 106), through wireless network 107 to client devices 101-106. Network 108 is enabled to employ any form of computer readable media for communicating information from one electronic device to another. Also, network 108 can include the Internet in addition to LANs, WANs, direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of CPD 109 is described in more detail below in conjunction with FIG. 3. Briefly, however, CPD 109 includes virtually any network device usable to operate as a content server to connect to network 108 to provide content to client devices 101-106. In some embodiments, CPD 109 may provide access to available versions of user selected content and store a separate package that includes the corresponding audio and video files for the available versions of that content. If the client device provides a license to download an available version of the content, CPD 109 accesses the stored package to deliver the video and audio versions to the client device, such as client devices 101-106. Devices that may operate as CPD 109 include various network devices, including, but not limited to personal computers, desktop computers, multiprocessor systems, microprocessor-based or programmable consumer electronics, network PCs, server devices, network appliances, and the like. The license is provided to the client device by license server device 110 if the client device is approved and a subset manifest file is determined to not be tampered.

Although FIG. 1 illustrates CPD 109 and license server device 110 as separate computing devices, the invention is not so limited. For example, one or more functions of CPD 109 and/or license server device 110 may be distributed across one or more distinct network devices. Moreover, CPD 109 and/or license server device 110 is not limited to a particular configuration. Thus, in one embodiment, CPD 109 and/or license server 110 may contain a plurality of network devices to provide content to a client device, such as client devices 101-106. Similarly, in another embodiment, CPD 109 and/or license server device 110 may contain a plurality of network devices that operate using a master/slave approach, where one of the plurality of network devices of CPD 109 and/or license server device 110 operates to manage and/or otherwise coordinate operations of the other network devices. In other embodiments, CPD 109 and/or license server device 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
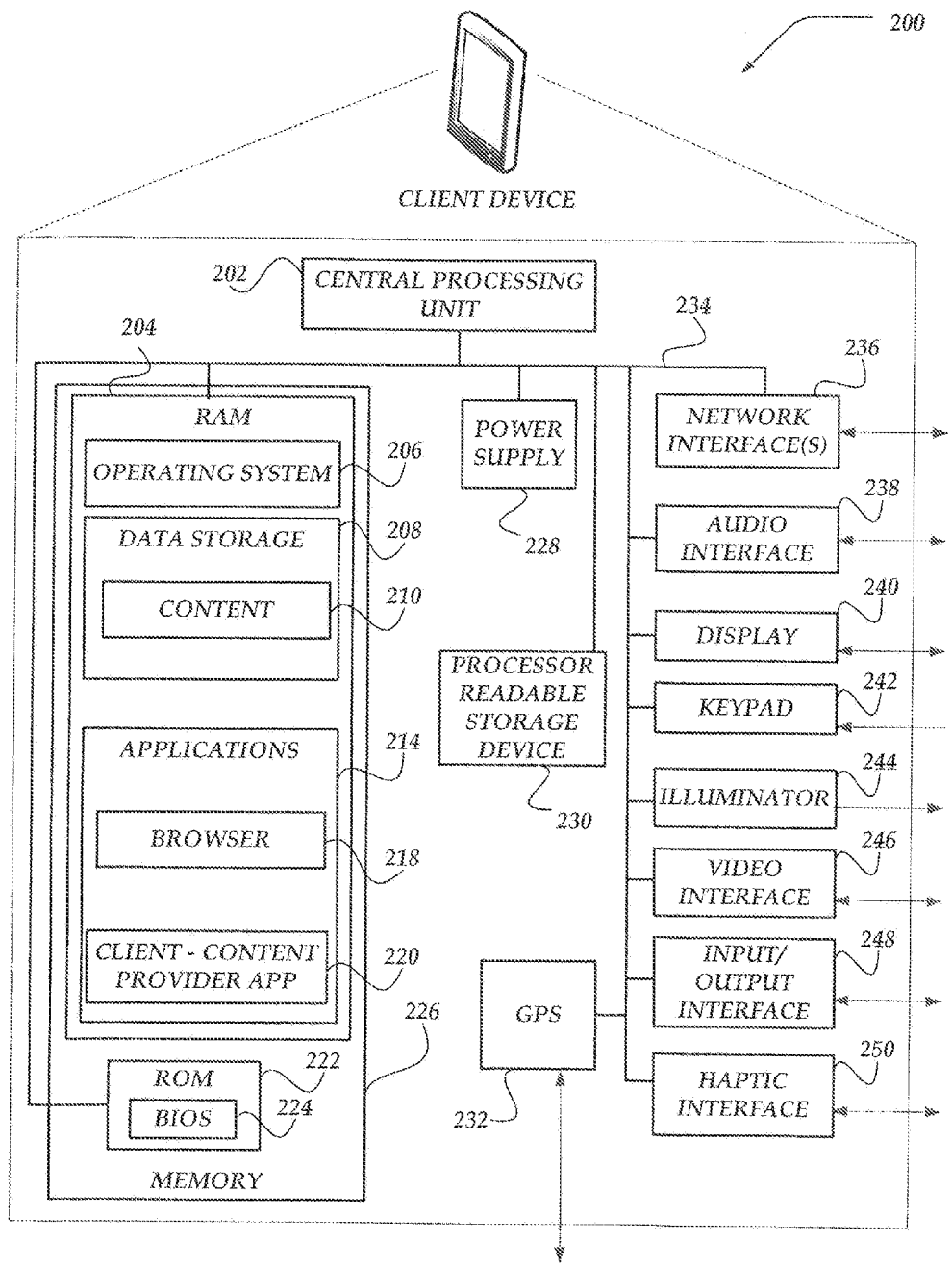
FIG. 2 shows an embodiment of a client device that may be included in a system such as that shown in FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), high speed download packet access ("HSDPA"), long term evolution, ("LTE"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, Apple Computer's iOS™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to processor readable storage device 230, a disk drive device or other computer-readable storage device (not shown) within client device 200.

Data storage 208, in other embodiments, may further store content 210. Content 210 may include a plurality of different content that can be selected by a user of client device 200 to be displayed such as by display 240. In some embodiments, data storage 208 may act as a buffer for content received from CPD 109 and/or license server device 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, and client-content provider app 220.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive content from another computing device, such as CPD 109 and/or license server device 110 of FIG. 1.

Client-content delivery app 220 is configured to receive audio and video files from another computing device, such as CPD 109 of FIG. 1. Content re-multiplexor 220 may, in one embodiment, provide a GUI to enable a user to select an available version of content based on a search and/or selected preferences. In some embodiments, the selected preferences may be selected by a user of client device 200. In other embodiments, the selected preferences may be automatically selected by a source of the content such as CPD 109. In any event, client-content provider app 220 may employ processes, or parts of processes, similar to those described elsewhere in the Specification such as in conjunction with FIGS. 4-6 to perform at least some of its actions.

Illustrative Network Device

Figure 3:
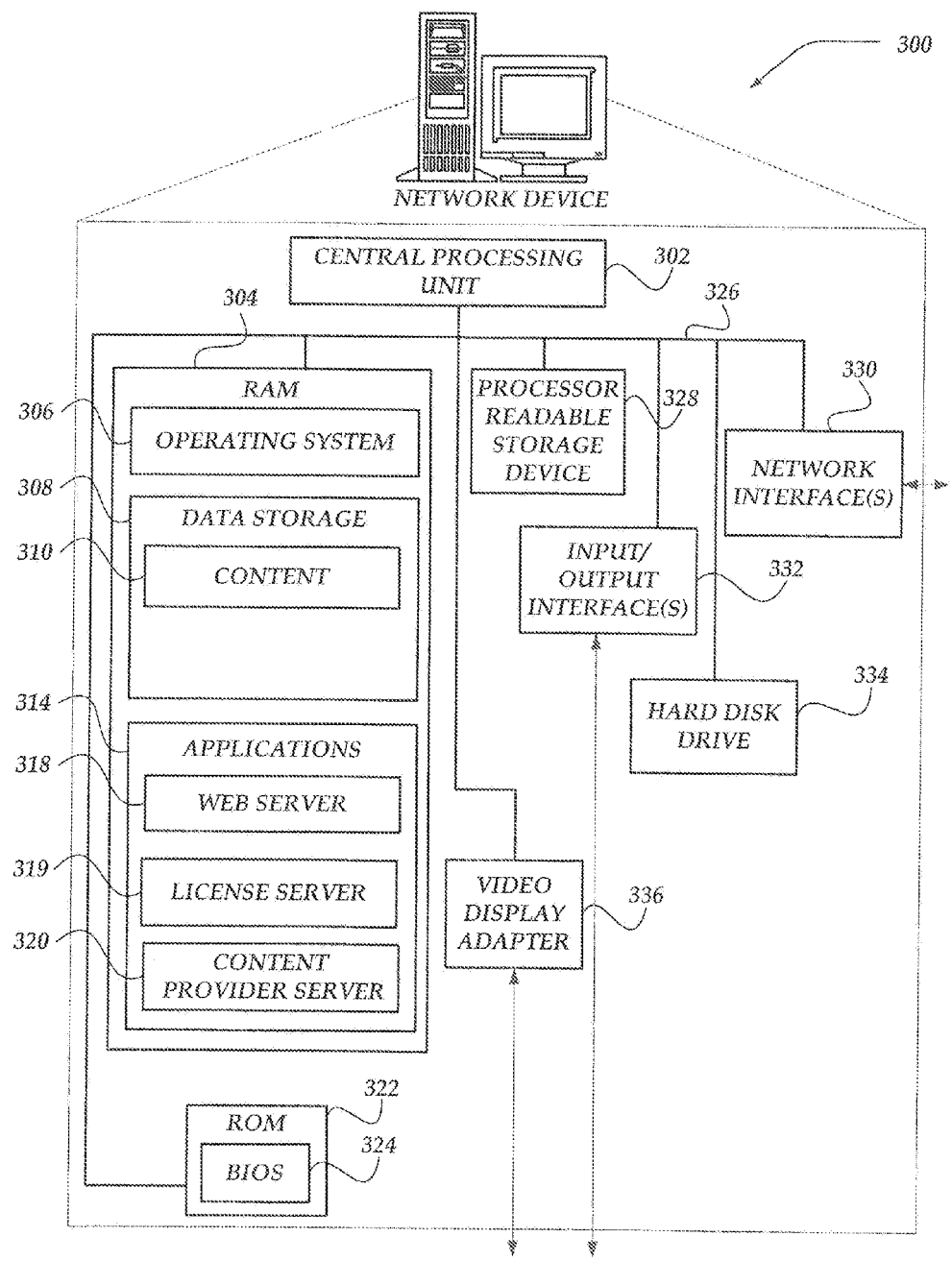
FIG. 3 illustrates an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, a client, a peer, a host, or any other device. Network device 300 may represent, for example CPD 109, license server device 110, Client Devices 101-106, and/or of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or NIC.

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD"), blu-ray or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to processor readable storage device 328, hard disk drive 334, or the like.

Data storage 308 may further store content 310. Content 310 may be configured substantially similar to content 210 of FIG. 2, as described above. In some embodiments, content 310 may include a plurality of available versions of content. In one embodiment, the available versions may include one or more video tracks and/or one or more one or more audio tracks. In some embodiments, each video track may be in a different video format, quality, or the like. In other embodiments, each audio track may be in a different audio format, quality, audio language, or the like. In some embodiments, content 310 may be included in a network device, such as CPD 109 of FIG. 1.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, license server 319, and content provider server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Browser 318 may also be configured to enable a user of a client device, such as client devices 101-106 of FIG. 1, to browse content, such as content 310, and select content for display on the client device.

License server 319 is configured to compare stored hash values to hash values regenerated by a client device and provide a license if the comparison is affirmative and the client device is approved to access selected available versions of content. In some embodiments, license server 319 may be included in a network device, such as license server device 110 of FIG. 1.

Content provider server 320 may operate in a manner somewhat similar to CPD 109 of FIG. 1. In any event, content provider server 320 may employ processes, or parts of processes, similar to those described elsewhere in the Specification such as in conjunction with FIGS. 4-6 to perform at least some of its actions.

Generalized Operation

Figure 4:
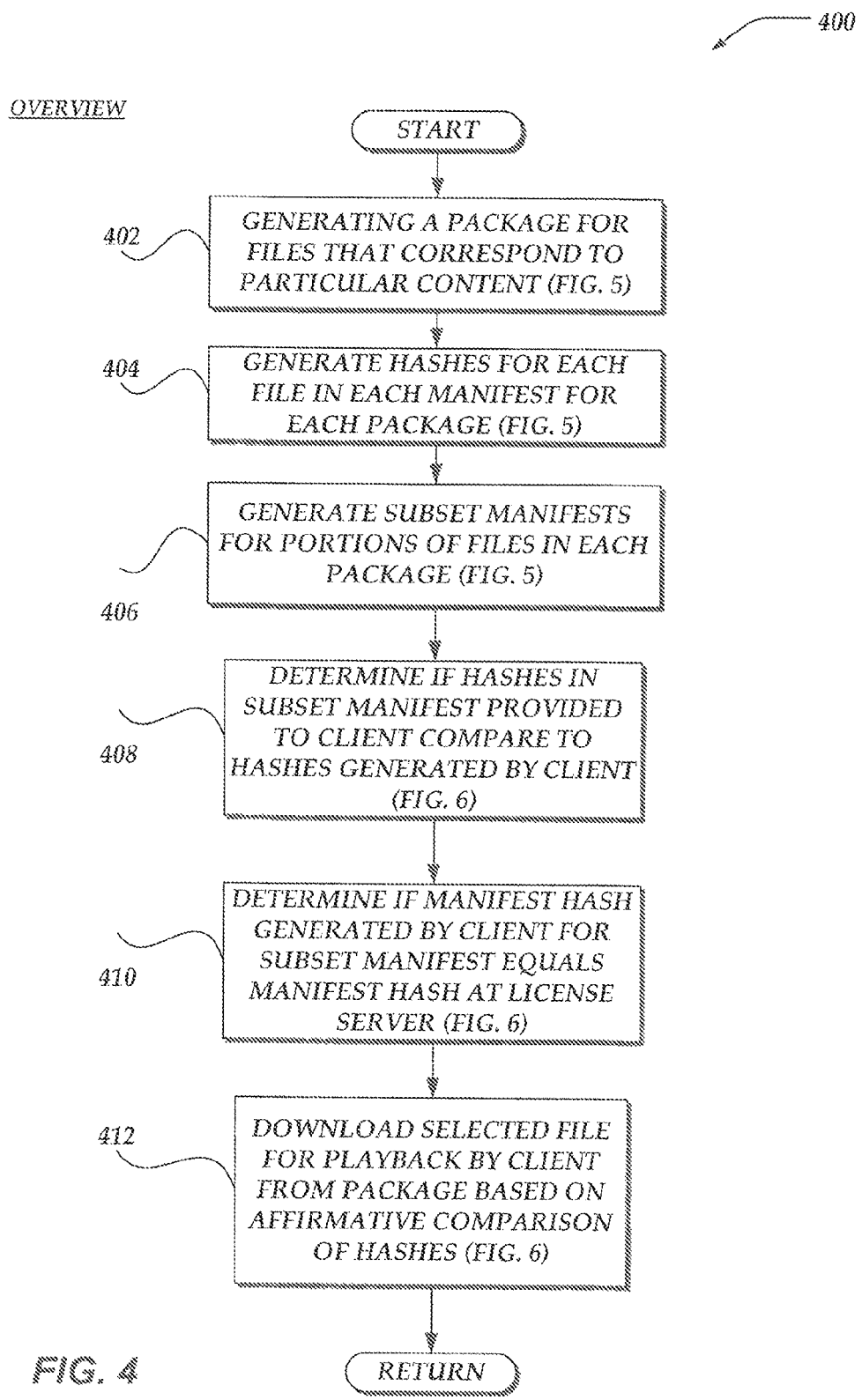
FIG. 4 shows a logical flow diagram generally showing one embodiment of an overview process for generating a package of video and audio files for available versions of content and employing a subset manifest to download those files from the package to a client for playback of a selected version of the content.

FIG. 4 illustrates a flow chart for overview 400 of one embodiment for a process for securely providing access to an available version of content that is selected by a client. Moving from a start block, the process flows to block 402 where a package is generated that includes the audio and video files that correspond to the available versions of the same content. Also, a master manifest is generated for the package that lists the audio and video files included in the package. Other packages may be generated for the available versions for other content that include other audio and video files and another master manifest. Exemplary embodiments of manifests can be found in FIGS. 8-1, 8-2, and 8-2.

At block 404, a hash value is generated for each audio file and video file included in the package, and these hashes are included in the master manifest. Each package is stored at a content provider server.

Advancing to block 406, at least one subset manifest is generated based on editing the master manifest. The subset manifest lists an edited portion of the video and audio files included in the master manifest along with the corresponding hash values of each listed file. Also, a manifest hash value is generated for the subset manifest based on at least the bytes that make up the text of the subset manifest. These byes are put through a hashing algorithm that produces a cryptographic hash as an output. The hash values for the audio and video files included in the master and subset manifests and the manifest hash values for the subset manifests are stored at a license server.

Flowing to block 408, the process enables a client to generate hash values for each file listed in the subset manifest. In at least one embodiment, the generated hash values are based on a non-mutable portion of each file listed in the subset manifest. In at least another embodiment, the generated hash values are based on each of the entire files listed in the subset manifest. Further, the process determines if a comparison of the client's generated hash values to the hash values listed in the subset manifest indicates equality. If the comparison indicates inequality, then the process ends. However, if the determination at block 408 indicates equality, the process moves to block 410.

At block 410, the process enables the client to generate a manifest hash value based on the bytes of text that comprise the subset manifest. A license server compares the client's manifest hash to another manifest hash for the subset manifest that is stored at the license server. If false, then the process ends. However, if these manifest hashes are determined to be equal, the license server provides the client with a license that may also include a decryption key. The license enables the client to download the selected available version of the content from the content provider server.

Advancing to block 412, the client provides the license to the content provider server and downloads for playback the selected version of content. Further, if the content is encrypted, the client employs the key to decrypt the content. Next, the process returns to performing other actions.

Figure 5:
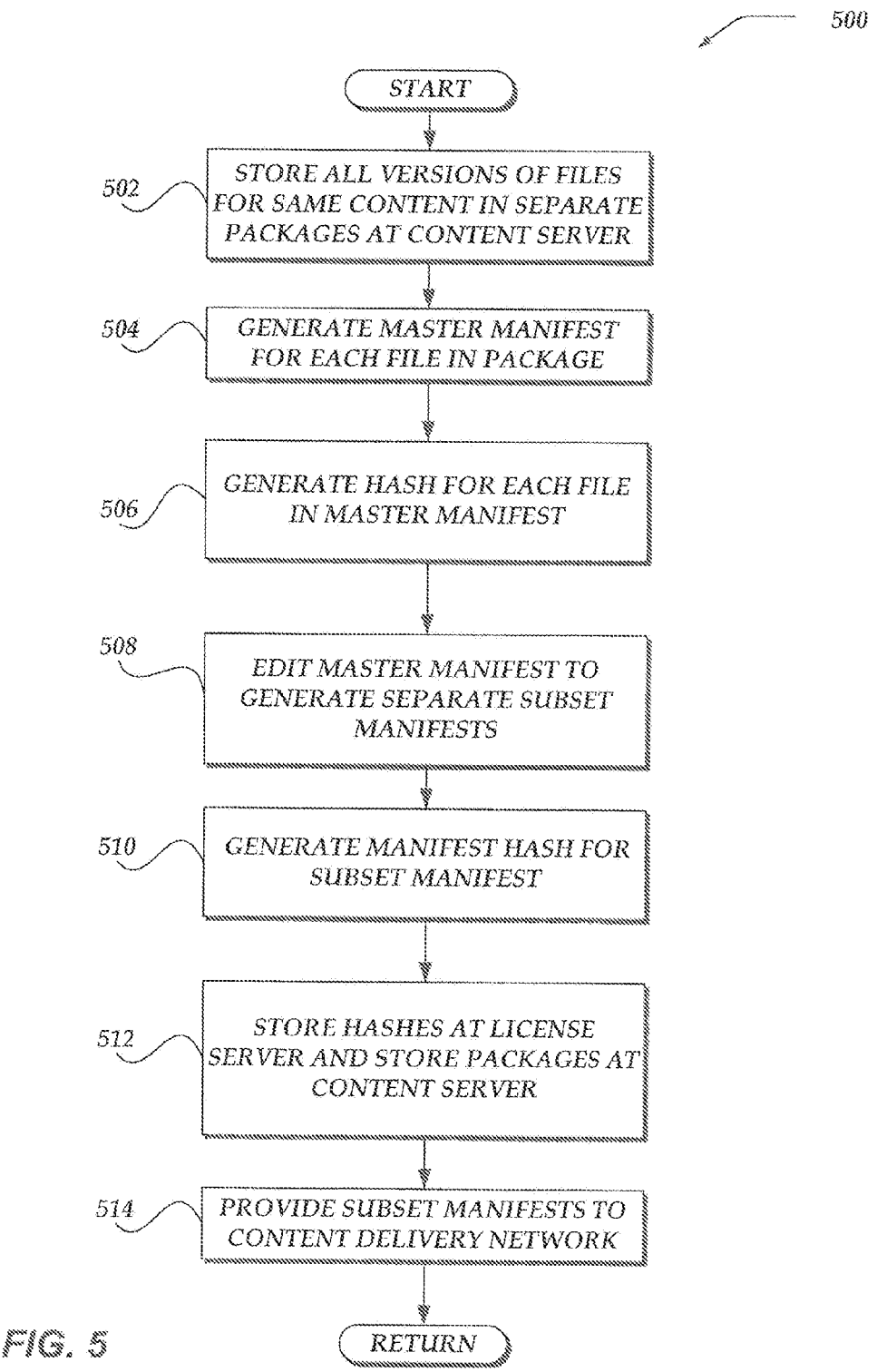
FIG. 5 illustrates a logical flow diagram generally showing one embodiment of a process for generating a package of video and audio files for all available version of content based on a master manifest of the files included in the package and a hash value for each these files.

FIG. 5 illustrates a logical flow diagram generally showing one embodiment of process 500 for generating a package of video and audio files for the available versions of the same content. The package includes a master manifest that list files included in the package and a hash value for each these files. Moving from a start block, the process steps to block 502 where all versions of audio and video files for the same content are stored in a package. Also, other versions of audio and video files for other content are stored in a different package. In at least one embodiment, each package is stored at a content server.

At block 504, the process generates a master manifest that lists each audio and video file included in the package. Stepping to block 506, the process generates a hash value for each file listed in the master manifest and stores the hash values in the master manifest. In at least one embodiment, it also stores the hash values at a licensing server. Also, each hash value for each file can be based on a portion of the corresponding file or the entire file.

At block 508, the master manifest is edited to generate one or more separate subset manifests which lists a portion of the files that are listed on the master manifest.

At block 510, master hash value is generated for each of the subset manifests based on the bytes of text that comprise each subset manifest.

At block 512, the generated hash values for the files and the manifest hashes are stored at least at the content server and at least copies of the manifest hashes are provided to a license server. Moving to block 514, the subset manifests are provided to a web application running on a content delivery network which is accessible to the client. Next, the process returns to performing other actions.

Figure 6:
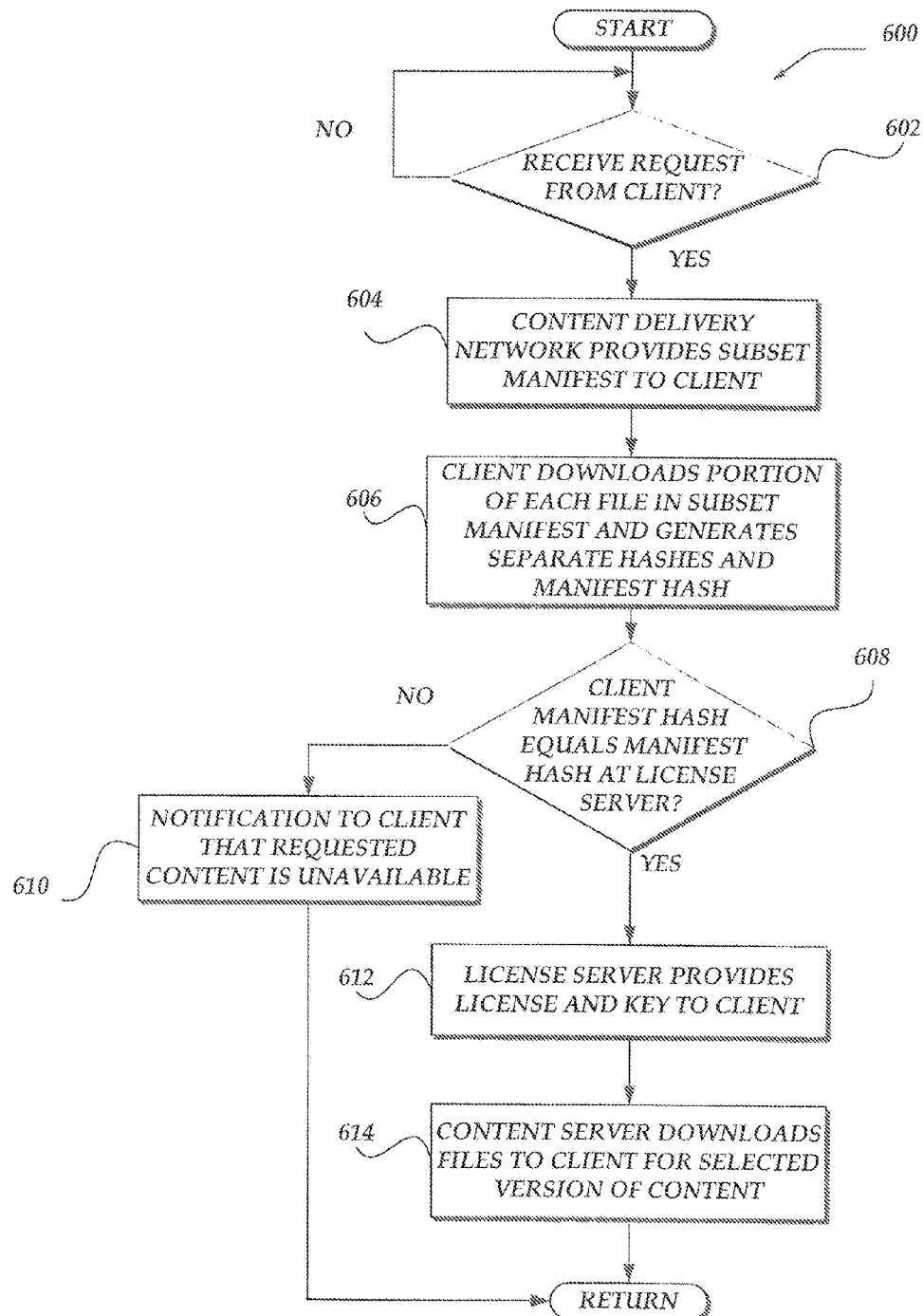
FIG. 6 shows a logical flow diagram generally showing one embodiment of an overview process for securely selecting an available version of the content for playback on a client based on a subset manifest and hash comparisons.

FIG. 6 shows a logical flow diagram generally showing one embodiment of overview process 600 for securely downloading an available version of content for playback on a client based at least in part on a subset manifest and hash comparisons. Stepping from a start block, the process advances to decision block 602 where a determination is made as to whether a request is received from a client for content. For example, the client may have accessed a website over a network. If false, the process recursively loops. However, if the determination at decision block 602 is affirmative, the process moves to block 604 where a content delivery network provides a subset manifest for content chosen by the client.

At block 606, the client downloads at least a portion of each file listed on the subset manifest and uses at least this portion to generate a hash value for each file. In at least one embodiment, the generated hash values are based on a non-mutable portion of each file listed in the subset manifest. In at least another embodiment, the generated hash values are based on each of the entire files listed in the subset manifest. The client also generates a manifest hash value for the bytes of text that comprise the subset manifest. Further, the process compares the client's generated hash values to the hash values listed in the subset manifest for equality. If false, then the process ends. However, if the determination at block 606 is affirmative, the process moves to decision block 608.

Flowing to decision block 608, the client provides its manifest hash to the license server, which makes a determination as to whether the client is approved for accessing content and the client's manifest hash is equal to another manifest hash for the subset manifest that is stored at the license server. If negative, the process moves to block 610 where a notification is provided to the client indicating that the requested content is unavailable, and the process returns to performing other actions.

However, if the determination at decision block 608 is affirmative, the process moves to block 612 where the license server provides the client with a license that may also include a decryption key. The client provides the license to a content provider server and requests downloading of a selected available version of the content from the content provider server.

Advancing to block 614, the content provider server accesses the corresponding package that includes the audio and video files that correspond to the version of the content selected and requested by a user. The client employs the key to decrypt the downloaded version of the content and play it back for the user. Next, the process returns to performing other actions.

Figure 7:
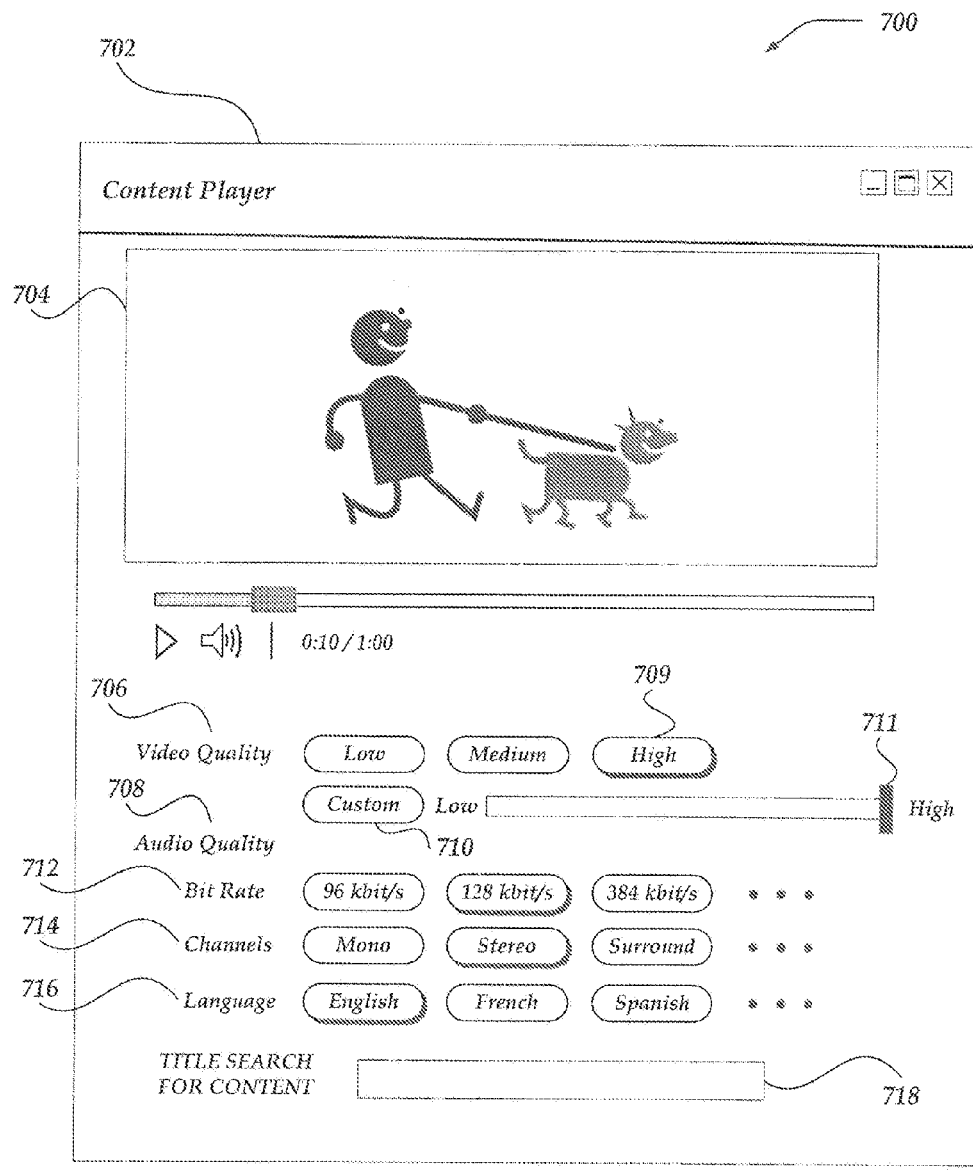
FIG. 7 illustrates a non-exhaustive example of a use case of an embodiment of a Graphical User Interface (GUI) for enabling a user to choose an available version of selected content for playback at a client.

FIG. 7 illustrates a non-exhaustive example of a use case of an embodiment of a Graphical User Interface (GUI) 700 for enabling a user to choose an available version of selected content for download to a client. The files listed in each subset manifest is employed by the GUI to display various options for the user to choose regarding a version of content that is available for downloading and subsequent playback. Content player 702 includes display 704 for playing back a selected version of content. Various controls are provided to enable the user to select an available version of content for playback. Video quality control 706 enables the selection of a video resolution, and audio quality control enables selection of audio bit rate sampling 712, audio channels 714, and spoken language 716. Also, search control 718 is provided for a user to search for and select particular content for display.

FIG. 8-1 shows a non-exhaustive example of a master manifest of a plurality of files included in a package. The master manifest is depicted as a markup language file.

FIG. 8-2 illustrates a non-exhaustive example of a master manifest of a plurality of files in a package along with a hash value for each file. The master manifest is depicted as a markup language file.

FIG. 8-3 shows a non-exhaustive example of a subset manifest of a plurality of files along with a hash value for each of these files. The subset manifest is depicted as a markup language file.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for providing content over a network, comprising:

generating a package that includes a plurality of files that correspond to versions of the same content, wherein the package is stored at a content server device separate from another generated package that contains another plurality of files that correspond to versions of other content;

generating at least one subset manifest that lists a portion of the plurality of files included in each package, wherein at least one of the plurality of files included in each package is absent from the subset manifest, wherein the at least one subset manifest includes at least a hash for each of the listed files, and wherein the at least one subset manifest includes bytes of text;

in response to a request, providing the subset manifest to a client device;

enabling the client device to perform a first hash comparison to determine if the hashes included in the subset manifest for each of the listed files are equal to other hashes generated by the client device for each of the files listed in the subset manifest;

employing a license server device to perform a second hash comparison to determine if a manifest hash generated by the client device for the subset manifest is equal to another manifest hash for the subset manifest, wherein said another manifest hash is stored at the license server device, and wherein said another manifest hash for the subset manifest is based on the bytes of text in the at least one subset manifest; and if the first hash comparison and the second hash comparison are both affirmative, downloading, at the client device, at least one selected file listed in the subset manifest for playback for a user.

2. The method of claim 1, further comprising:
generating a separate master manifest for each package that lists each file included in each package; and
editing the master manifest to generate each subset manifest.

3. The method of claim 1, further comprising hashing a non-mutable portion of each file to generate each hash included for each file for the subset manifest, wherein the client device also generates its hashes for comparison based on the non-mutable portion of each file.

4. The method of claim 1, wherein the affirmative comparison further comprises:
employing the license server device to provide at least a license to the client device for playing back at least one of the files listed in the subset manifest;
employing a content server device to download the selected file to the client device for playback based on the license that the client device provides to the content server device.

5. The method of claim 1, wherein the plurality of files included in the package include a plurality of types of files that correspond to versions of the content, wherein the versions include at least video files having different resolutions and audio files that differ by at least one of a spoken language, an amount of audio channels, and a sampling bit rate for an audio signal.

6. A server device for providing content over a network, comprising:
a transceiver that communicates over the network;
a memory that stores at least instructions; and
a processor that executes instructions that enable actions, comprising:
generating a package that includes a plurality of files that correspond to versions of the same content, wherein the package is stored at a content server device separate from another generated package that contains another plurality of files that correspond to versions of other content;
generating at least one subset manifest that lists a portion of the plurality of files included in each package, wherein at least one of the plurality of files included in each package is absent from the subset manifest, wherein the at least one subset manifest includes at least a hash for each of the listed files, and wherein the at least one subset manifest includes bytes of text;
in response to a request, providing the subset manifest to a client device;
enabling the client device perform a first hash comparison to determine if the hashes included in the subset manifest for each of the listed files are equal to other hashes generated by the client device for each of the files listed in the subset manifest;
employing a license server device to perform a second hash comparison to determine if a manifest hash generated by the client device for the subset manifest is equal to another manifest hash for the subset manifest that is stored at the license server device, wherein said another manifest hash for the subset manifest is based on the bytes of text in the at least one subset manifest; and
if the first hash comparison and the second hash comparison are both affirmative, downloading, at the client device, at least one selected file listed in the subset manifest for playback for a user.

7. The Server Device of claim 6, further comprising:
generating a separate master manifest for each package that lists each file included in each package; and
enabling editing of the master manifest to generate each subset manifest.

8. The Server Device of claim 6, further comprising hashing a non-mutable portion of each file to generate each hash included for each file for the subset manifest, wherein the client device also generates its hashes for the comparison based on the non-mutable portion of each file.

9. The Server Device of claim 6, further comprising:
employing the license server device to provide at least a license to the client device for playing back at least one of the files listed in the subset manifest; and
employing a content server device to download the selected file to the client device for playback based on the license that the client device provides to the content server device.

10. The Server Device of claim 6, wherein the plurality of files included in the package include a plurality of types of files that correspond to versions of the content including at least video files having different resolutions and audio files that differ by at least one of a spoken language, an amount of audio channels, and a sampling bit rate for an audio signal.

11. A processor readable non-transitive storage media that includes processor executable instructions for providing content over a network, wherein the execution of the instructions by a processor device enables actions, comprising:
generating a package that includes a plurality of files that correspond to versions of the same content, wherein the package is stored at a content server device separate from another generated package that contains another plurality of files that correspond to versions of other content;
generating at least one subset manifest that lists a portion of the plurality of files included in each package, wherein at least one of the plurality of files included in each package is absent from the subset manifest, wherein the at least one subset manifest includes at least a hash for each of the listed files, and wherein the at least one subset manifest includes bytes of text;
in response to a request, providing the subset manifest to a client device;
enabling the client device to perform a first hash comparison to determine if the hashes included in the subset manifest for each of the listed files are equal to other hashes generated by the client device for each of the files listed in the subset manifest;
employing a license server device to perform a second hash comparison to determine if a manifest hash generated by the client device for the subset manifest is equal to another manifest hash for the subset manifest that is stored at the license server device, wherein said another manifest hash for the subset manifest is based on the bytes of text in the at least one subset manifest; and
if the first hash comparison and the second hash comparison are both affirmative, downloading, at the client device, at least one selected file listed in the subset manifest for playback for a user.

12. The media of claim 11, further comprising:
generating a separate master manifest for each package that lists each file included in each package; and
editing the master manifest to generate each subset manifest.

13. The media of claim 11, further comprising hashing a non-mutable portion of each file to generate each hash included for each file for the subset manifest, wherein the client device also generates its hashes for the comparison based on the non-mutable portion of each file.

14. The media of claim 11, further comprising:
    employing the license server device to provide at least a license to the client device for playing back at least one of the files listed in the subset manifest; and
    employing a content server device to download the selected file to the client device for playback based on the license that the client device provides to the content server device.

15. The media of claim 11, wherein the plurality of files included in the package include a plurality of types of files that correspond to the versions of the content including at least video files having different resolutions and audio files that differ by at least one of a spoken language, an amount of audio channels, and a sampling bit rate for an audio signal.

16. The method of claim 1, further comprising:
    storing said another manifest hash for the subset manifest at the license server device such that said another manifest hash for the subset manifest is a hash of the bytes of text of the at least one subset manifest.

17. The method of claim 1, further comprising:
    storing a separate master manifest for each package that lists each file included in the package, wherein generating at least one subset manifest is accomplished such that each subset manifest of the at least one subset manifest lists a portion of the files included in the package, and such that each subset manifest of the at least one subset manifest lists less files than the master manifest for the package lists.

\* \* \* \* \*